United States Patent [19]

Hari et al.

[11] 4,044,036
[45] Aug. 23, 1977

[54] METAL COMPLEXES OF BIS-AZOMETHINES FROM HYDROXY-ALDEHYDES AND ALKYLENE DIAMINES

[75] Inventors: Stefan Hari, Allschwil, Switzerland; Alexander McHugh Irvine, Paisley, England; James McGeachie McCrae, Stewarton, Scotland; Laurent Vuitel; Francois L'Eplattenier, both of Therwil, Switzerland

[73] Assignee: Ciba-Geigy Corporation, Ardsley, N.Y.

[21] Appl. No.: 504,597

[22] Filed: Sept. 9, 1974

[30] Foreign Application Priority Data

Sept. 11, 1973 United Kingdom ............ 42659/73

[51] Int. Cl.² .............................................. C07F 1/08
[52] U.S. Cl. ............................. 260/438.1; 106/193 P; 106/241; 106/288 Q; 260/2.5 HK; 260/37 R; 260/429 C; 260/429.9; 260/439 R
[58] Field of Search ............. 260/429 C, 429.9, 438.1, 260/439 R

[56] References Cited

U.S. PATENT DOCUMENTS

| | | | |
|---|---|---|---|
| 2,450,276 | 9/1948 | Folgers et al. | 260/429 C |
| 2,615,860 | 10/1952 | Burgess | 260/429.9 X |
| 3,398,170 | 8/1968 | Cyba | 260/439 R |
| 3,440,254 | 4/1969 | Lenoir et al. | 260/438.1 X |
| 3,472,876 | 10/1969 | Klein | 260/439 R X |

OTHER PUBLICATIONS

Martell et al., Chemistry of the Metal Chelate Compounds, Prentice-Hall, Inc., N.Y., pp. 17, 69, 70, 140, 214–216, 228, 269, 271, 274, 289, 291, 292, 338 (1952).

Dwyer et al., Chelating Agents and Metal Chelates, Academic Press, N.Y., pp. 167, 168, 170 to 173, 177 to 181 (1964).

Bailar, The Chemistry of the Coordination Compounds, Reinhold Publ. Corp., N.Y., pp. 46, 235, 236, 259, 260, 287, 321, 391 (1956).

J.A.C.S., vol. 66, pp. 952, 2267, 2268 (1946).

*Primary Examiner*—Helen M. S. Sneed
*Attorney, Agent, or Firm*—Vincent J. Cavalieri

[57] ABSTRACT

1:1 metal complexes of bis-azomethines of the formula

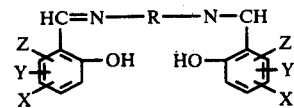

wherein R denotes an alkylene radical which contains 2-8 C atoms and is optionally interrupted by heteroatoms, X denotes a H or halogen atom or an alkyl, alkoxy, carboxyl, alkoxy-carbonyl or phenylazo group and Y and Z denote H or halogen atoms, or wherein the substituents Y and Z form a fused benzene ring, if R contains a hetero-atom, Y and Z must not be H atoms, and if R contains 2 C atoms, X, Y and Z must not be H atoms, and a metal are valuable pigments coloring plastics and printing inks in fast yellow to range shades.

10 Claims, No Drawings

METAL COMPLEXES OF BIS-AZOMETHINES FROM HYDROXY-ALDEHYDES AND ALKYLENE DIAMINES

The present invention relates to metal complexes of bis-azomethines and their production.

Accordingly the present invention provides valuable new 1:1 metal complexes of bis-azomethines of the formula

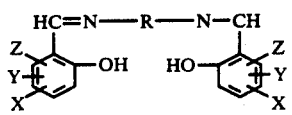

wherein R denotes an alkylene radical which contains 2 – 8 C atoms and is optionally interrupted by heteroatoms, X denotes a H or halogen atom or an alkyl, alkoxy, carboxyl, alkoxy-carbonyl or phenylazo group and Y and Z denote H or halogen atoms, or wherein the substituents Y and Z form a fused benzene ring and, if R contains a hetero-atom, Y and Z must not be H atoms, and if R contains 2 C atoms, X, Y and Z must not be H atoms, and a metal.

The complexes may be produced by treating the bis-azomethine compound with a metal donor.

Of particular interest are 1:1 copper, nickel or zinc complexes of bis-azomethines of the formula

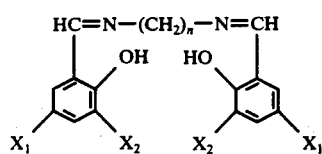

wherein $X_1$ denotes a H or halogen atom, an alkoxycarbonyl group containing 2 – 6 C atoms, a carbamoyl group or a phenylazo group, $X_2$ denotes a H or halogen atom and n denotes a number from 5 – 7, and especially 1:1 nickel complexes of bis-azomethine of the formula

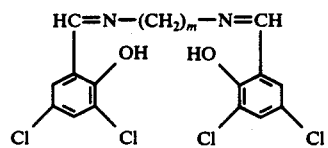

wherein m denotes a number from 5 – 7.

Other compounds of particular interest are metal, e.g. copper, nickel or zinc, complexes of bis-azomethines of the formula

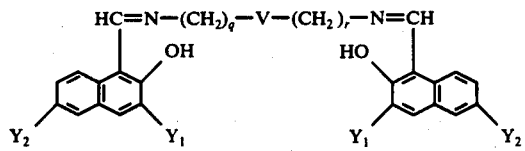

wherein V denotes an O or S atom or an imino group, $Y_1$ denotes a H atom, a carboxyl group, an alkoxycarbonyl group containing 2 – 6 C atoms, a carbamoyl group, an alkylcarbamoyl group containing 2 – 6 C atoms or a phenylcarbamoyl group, $Y_2$ denotes a H or halogen atom, an alkoxy group containing 1 – 4 C atoms or a nitro or nitrile group and q and r denote, a number from 2 – 4, especially those of the formula

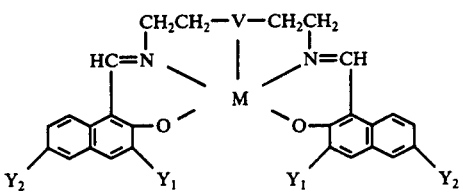

wherein M denotes a copper, nickel or zinc atom, V denotes an O or S atom or an imino group and $Y_1$ and $Y_2$ have the indicated meaning.

Other compounds of particular interest are metal complexes of bis-azomethines of the formula

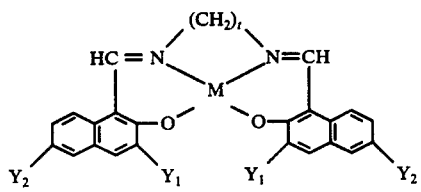

wherein M, $Y_1$ and $Y_2$ have the indicated meaning and t denotes a number from 3 – 6, or metal complexes of the formula

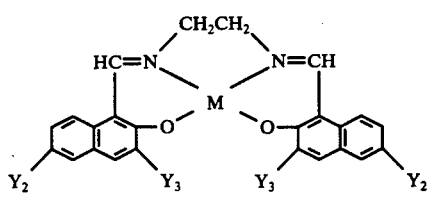

wherein $Y_3$ denotes a carboxyl group, an alkoxycarbonyl group containing 2 – 6 C atoms, a carbamoyl group, an alkylcarbamoyl group containing 2 – 6 C atoms or a phenylcarbamoyl group and M and $Y_2$ have the indicated meaning.

The bis-azomethines which serve as starting compounds may be obtained according to known processes by condensation of one mol of a diamine of the formula

with 2 mols of an o-hydroxyaldehyde of the formula

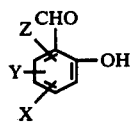

with $R_1$, X, Y and Z in the indicated formulae having the abovementioned meaning.

As examples of o-hydroxybenzaldehydes there may be mentioned: Salicylaldehyde, 4-chloro-2-hydroxybenzaldehyde, 5-chloro-2-hydroxybenzaldehyde, 3-nitro-2-hydroxybenzaldehyde, 5-nitro-2-hydroxybenzaldehyde, 3,5-dichloro-2-hydroxybenzaldehyde, 3,5-dibromo-2-hydroxybenzaldehyde, 5-phenylazo-2-hydroxybenzaldehyde, 5-(2′-chloro-phenylazo)-2-hydroxybenzaldehyde, 5-(2′,5′-dichloro-phenylazo)-2-hydroxybenzaldehyde, 5-(2′-methyl-phenylazo) -2-hydroxybenzaldehyde, 5-(2′-methoxy-phenylazo) -2-hydroxybenzaldehyde, 5-(2′-methoxy-4′-nitrophenylazo) -2-hydroxybenzaldehyde and 5-(2'-methoxy-5'-carbamoyl-phenylazo)-2-hydroxybenzaldehyde.

Amongst the series of hydroxynaphthaldehydes there should be mentioned: 2-Hydroxynaphthaldehyde, 6-bromo-2-hydroxynaphthaldehyde, 5-nitro-2-hydroxynaphthaldehyde, 2-hydroxy-3-carboxy-naphthaldehyde, 2-hydroxy-3-methoxycarbonyl-naphthaldehyde, 2-hydroxy-3-phenylcarbamoyl-naphthaldehyde, 2-hydroxy-3(4'-chlorophenylcarbamoyl)-naphthaldehyde, 2-hydroxy-3-(4'-chloro-2'-methylphenylcarbamoyl-naphthaldehyde, 2-hydroxy-3-(2',5'-dimethoxy-3'-chloro-phenylcarbamoyl-naphthaldehyde, 2-hydroxy-6-bromo-3-carboxynaphthaldehyde and 2-hydroxy-6-bromo- 3-phenylcarbamoylnaphthaldehyde.

As diamines, alkylenediamines should be mentioned in particular, for example ethylenediamine, 1,2- and 1,3-propylenediamine, 1,2-, 1,3- and 1,4-butylenediamine, 1,5-pentylenediamine, 1,6-hexylenediamine, 1,7-heptylenediamine and 1,8-octylenediamine.

The following amines should be mentioned from amongst the series of the diamines of which the alkylene radical is interrupted by a hetero-atom:
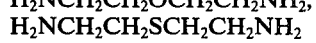
 and

The condensation of the aldehyde with the diamine is appropriately carried out in water or in an organic solvent at elevated temperature, preferably between 50° C and the boiling point of the solvent used. As examples of solvents there may be mentioned: Water, alcohols, glacial acetic acid, dioxane, dimethylformamide, N-methylpyrrolidone, butyrolactone, glycol monomethyl ether, xylene, chlorobenzene, o-dichlorobenzene, nitrobenzene or mixtures thereof.

Since the bis-azomethines obtained are sparingly soluble in the solvents mentioned, they can easily be isolated by filtration. Any impurities can be removed by elution.

For conversion to the metal complexes, the bis-azomethines obtained are treated with agents which donate divalent metals, for example with salts of zinc, but especially of copper and above all of nickel. Preferably, the formates, acetates or stearates of these metals are used. The metallization is appropriately carried out in one of the abovementioned solvents.

The metallisation can also be carried out simultaneously with the condensation by condensing the aldehyde together with the diamine in one of the abovementioned solvents in the presence of metal salts.

The new colourants are valuable pigments which are distinguished by pure shades and good fastness to light and to migration and can be used in a finely divided form for pigmenting high molecular organic material such as, for example, cellulose ethers and cellulose esters, such as ethylcellulose, nitrocellulose, cellulose acetate, cellulose butyrate, natural resins or synthetic resins, such as polymerisation resins or condensation resins, for example aminoplasts, especially ureaformaldehyde and melamine-formaldehyde resins, alkyd resins, phenoplasts, polycarbonates, polyolefines, such as polystyrene, polyvinyl chloride, polyethylene, polypropylene, polyacrylonitrile, polyacrylic acid esters, polyamides, polyurethanes or polyesters, rubber, casein, silicone and silicone resins, individually or as mixtures.

It is immaterial whether the high molecular compounds mentioned are in the form of plastic masses or melts or in the form of spinning solutions, lacquers, paints or printing inks. Depending on the end use it proves advantageous to use the new pigments as toners or in the form of preparations.

The invention is illustrated by the following Examples, in which the parts, unless otherwise stated, denote parts by weight and the percentages denote percentages by weight.

EXAMPLE 1

19.1 parts of 3,5-dichlorosalicylaldehyde and 6 parts of hexamethylenediamine in 400 parts by volume of alcohol are heated to 78° C and the mixture is stirred for 2 hours at this temperature, cooled to 10° C and filtered. The residue is washed with a little alcohol and dried. 22.6 parts (97.4% of theory) of a lemon-yellow crystal powder of melting point 154°–156° C are obtained.

4.6 parts of this product and 2.7 parts of nickel acetate tetrahydrate in 220 parts by volume of methanol are heated to 66° C whilst stirring vigorously, and the mixture is stirred for 2 hours at this temperature, cooled to room temperature and filtered. The filter residue is successively washed with hot methanol, hot water and again with hot methanol and dried. The resulting pigment is a yellow-green powder and corresponds to a 1:1 nickel complex of the biz-azomethine of the formula

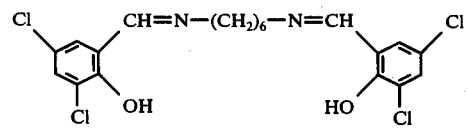

The yield is 5.1 parts (98% of theory). This nickel complex dyes polyvinyl chloride in pure green-yellow shades of very good fastness to light and to migration.

Microanalysis: Calculated: C, 46.3; H, 3.5; Cl, 27.3; N, 5.4; Ni, 11.3. Found: C, 46.8; H, 3.6; Cl, 27.2; N 5.6; Ni, 10.7.

As compared to the metal complexes described in Japanese Patent Specification No. 490,796 and obtained by condensation of o-hydroxybenzaldehydes with ethylenediamine, this pigment is distinguished, surprisingly, by a considerably purer shade and better fastness to light. The same pigment can also be manufactured from the components in a one-pot process.

EXAMPLES 2 – 25

1:1 metal complexes of bis-azomethines of the formula

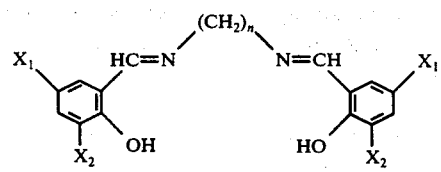

wherein $X_1$, $X_2$ and n have the meaning indicated in Table I which follows are obtained when an o-hydroxyaldehyde of the formula

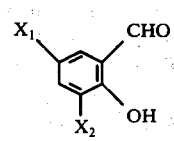

wherein $X_1$ and $X_2$ have the meaning indicated in Table I below is condensed with a diamine of the formula $$H_2N(CH_2)_nNH_2$$

wherein n has the meaning indicated in Table I, in the molar ratio of 2:1 in accordance with the instructions of Example 1 and the resulting bis-azomethine is metallised with the acetate of the metal mentioned in Table I.

Table I

| Ex. No. | $X_1$ | $X_2$ | M | n | Shade in Laquer |
|---|---|---|---|---|---|
| 2 | Cl | Cl | Ni | 4 | Yellow-green |
| 3 | Cl | Cl | Ni | 5 | Yellow-green |
| 4 | Cl | Cl | Ni | 7 | Yellow-green |
| 5 | Cl | Cl | Ni | 8 | Yellow-green |
| 6 | 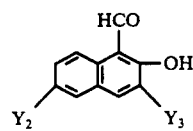 | H | Cu | 2 | Brown-red |
| 7 | " | H | Ni | 2 | Brown-red |
| 8 |  | H | Cu | 2 | Brown |
| 9 | " | H | Cu | 3 | Yellow |
| 10 | " | H | Ni | 3 | Yellow |
| 11 | (Cl,Cl-phenyl-N=N-) | H | Cu | 2 | Brown |
| 12 | " | H | Ni | 2 | Orange |
| 13 | " | H | Zn | 2 | Yellow-orange |
| 14 | " | H | Cu | 3 | Brown |
| 15 | " | H | Ni | 3 | Orange |
| 16 | " | H | Zn | 3 | Yellow-orange |
| 17 | (CH3-phenyl-N=N-) | H | Cu | 2 | Yellow-orange |
| 18 | " | H | Ni | 2 | Yellow-orange |
| 19 | " | H | Zn | 2 | Yellow |
| 20 | (H2NOC-phenyl(OCH3)-N=N-) | H | Cu | 6 | Brown |
| 21 | " | H | Ni | 6 | Yellow-orange |
| 22 | (Cl,Cl-phenyl-N=N-) | H | Cu | 6 | Yellow-brown |
| 23 | " | H | Ni | 6 | Yellow-brown |
| 24 | (CH3-phenyl-N=N-) | H | Cu | 6 | Yellow |
| 25 | " | H | Ni | 6 | Yellow |

EXAMPLES 26 – 50

Metal complexes of the formula

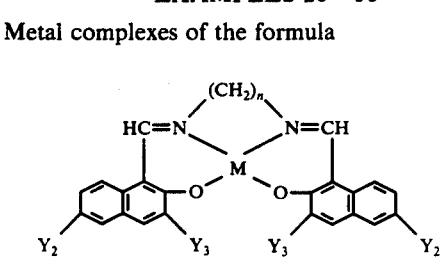

wherein $Y_2$, $Y_3$, M and n have the meaning indicated in Table II which follows are obtained when a hydroxynaphthaldehyde of the formula (naphthalene with HCO, OH, $Y_2$, $Y_3$ substituents)

wherein $Y_2$ and $Y_3$ have the meaning indicated in Table II which follows is condensed in accordance with the instructions of Example 1 with a diamine of the formula $$H_2N(CH_2)_nNH_2$$

wherein n has the meaning indicated in Table II, and the resulting bis-azomethine is metallised with the acetate of the metal mentioned in Table II.

Table II

| Example No. | $Y_3$ | $Y_2$ | M | n | Shade in PVC |
|---|---|---|---|---|---|
| 26 | COOH | H | Cu | 2 | Yellow-green |
| 27 | COOH | H | Ni | 2 | Yellow |
| 28 | COOH | H | Zn | 2 | Yellow |
| 29 | COOCH3 | H | Cu | 2 | Yellow |
| 30 | COOCH3 | H | Ni | 2 | Yellow-orange |
| 31 | CONH-phenyl | H | Cu | 2 | Brown |
| 32 | " | H | Ni | 2 | Yellow |
| 33 | CONH-(Cl-phenyl) | H | Ni | 2 | Yellow |
| 34 | CONH-(OCH3,OCH3-phenyl) | H | Cu | 2 | Yellow |
| 35 | CONH-(CH3-phenyl) | H | Ni | 2 | Yellow |
| 36 | " | H | Cu | 2 | Yellow-green |
| 37 | COOH | Br | Cu | 2 | Yellow |
| 38 | COOH | Br | Ni | 2 | Yellow |
| 39 | COOH | Br | Zn | 2 | Yellow |
| 40 | COOH | H | Cu | 3 | Green |
| 41 | COOH | H | Ni | 3 | Yellow |
| 42 | COOH | H | Zn | 3 | Yellow |
| 43 | CONH-phenyl | H | Cu | 3 | Yellow-green |
| 44 | " | H | Ni | 3 | Yellow |
| 45 | " | H | Zn | 3 | Yellow |
| 46 | H | H | Ni | 6 | Yellow |
| 47 | COOH | H | Cu | 6 | Yellow-green |
| 48 | CONH-phenyl | H | Cu | 6 | Yellow-brown |
| 49 | " | H | Ni | 6 | Yellow |

EXAMPLES 50 – 63

The metal complexes of the formula

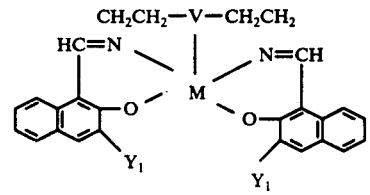

wherein V and $V_1$ have the meaning indicated in Table III below are obtained when a hydroxynaphthaldehyde of the formula

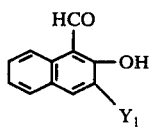

wherein $Y_1$ has the meaning indicated in Table III is condensed with a diamine of the formula

wherein V has the meaning indicated in Table III, in the molar ratio of 2:1, in accordance with the instructions of Example 1, and the resulting bis-azomethine is metallised with the acetate of the metal shown in Table III.

TABLE III

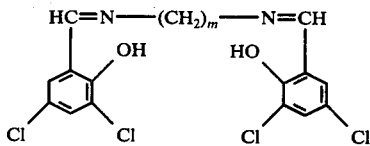

| Example No. | $Y_1$ | V | M | Shade in PVC |
|---|---|---|---|---|
| 50 | COOH | O | Cu | Yellow-green |
| 51 | COOH | O | Ni | Yellow |
| 52 | COOH | O | Zn | Yellow |
| 53 | CONHPh | O | Cu | Yellow-green |
| 54 | COOH | S | Cu | Yellow-green |
| 55 | COOH | S | Ni | Yellow |
| 56 | CONHPh | S | Cu | Yellow-green |
| 57 | COOH | NH | Cu | Green |
| 58 | COOH | NH | Ni | Yellow |
| 59 | COOH | NH | Zn | Yellow |
| 60 | COOCH$_3$ | NH | Ni | Yellow |
| 61 | CONHPh | NH | Cu | Yellow |
| 62 | CONHPh | NH | Ni | Yellow |
| 63 | COOCH$_3$ | NH | Ni | Yellow |

EXAMPLE 64

0.6 g of the pigment manufactured according to Example 1 are mixed with 67 g of polyvinyl chloride, 33 g of dioctyl phthalate, 2 g of dibutyl tin dilaurate and 2 g of titanium dioxide and the mixture is converted into a thin sheet on a roll mill over the course of 15 minutes at 160° C. The yellow dyeing thus produced is strongly coloured and fast to migration and to light.

EXAMPLE 65

1.00 g of the pigment manufactured according to Example 1 is finely ground with 4.00 g of print varnish of the following composition

| | |
|---|---|
| 29.4% of linseed oil/stand oil | (300 poise), |
| 67.2% of linseed oil/stand oil | (20 poise), |
| 2.1% of cobalt octoate | (8% of Co) and |
| 1.3% of lead octoate | (24% of Pb) | on an Engelsmann grinding machine and the mixture is then printed by means of a plate, using the letterpress printing process, onto art printing paper, applying 1 g/m². A strong, pure orange-tinged yellow shade of good transparency and good gloss is obtained. Very brilliant green shades can be produced in three-colour or four-colour printing by overprinting onto blue.

The pigment is also suitable for other printing processes, such as gravure printing, offset printing and flexographic printing and here again gives very good results.

EXAMPLE 66

19.1 parts of 3,5-dichlorosalicylaldehyde and 12.4 parts of Ni(ac)$_2$.4H$_2$0 in 500 ml of methanol are heated for 10 minutes to 60° C with vigorous stirring and 5.8 parts of hexamethylenediamine are then added. The reaction mixture is boiled for one hour under reflux and is filtered hot. The filter residue is successively washed with hot methanol, hot water and again with hot methanol and is dried. The properties of the pigment thus obtained are identical to those obtained according to Example 1. The yield is 25.0 parts (96% of theory).

What we claim is:

1. A 1:1 nickel complex of a bis-azomethine of the formula

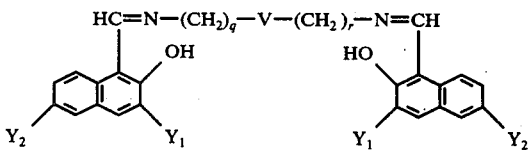

wherein $m$ denotes a number from 5-7.

2. A 1:1 copper, nickel or zinc complex of a bis-azomethine of the formula $$HC=N-(CH_2)_q-V-(CH_2)_r-N=CH$$

wherein V denotes an O or S atom or an imino group, $Y_1$ denotes a H atom, a carboxyl group, an alkoxycarbonyl group containing 2-6 C atoms, a carbamoyl group, an alkylcarbamoyl group containing 2-6 C atoms or a phenylcarbamoyl group, $Y_2$ denotes a H or halogen atom, an alkoxy group containing 1-4 C atoms or a nitro or cyano group and q and r denote a number from 2-4.

3. A metallised bis-azomethine according to claim 2, of the formula

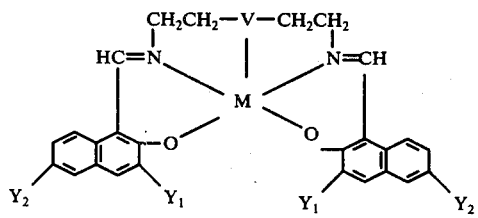

wherein $Y_1$, $Y_2$ and V have the meaning indicated in claim 2, and M denotes copper, nickel or zinc.

4. A metallized bis-azomethine of the formula

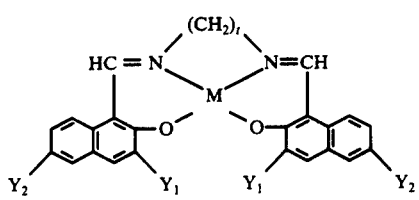

wherein M denotes a copper, nickel or zinc atom, t denotes a number from 3-6 and $Y_1$ denotes a H atom, a carboxyl group, an alkoxycarbonyl group containing 2-6 C atoms or a phenylcarbamoyl group and $Y_2$ denotes a H or halogen atom, an alkoxy group containing 1-4 C atoms or a nitro or cyano group.

5. A metallized bis-azomethine according to claim 4, of the formula

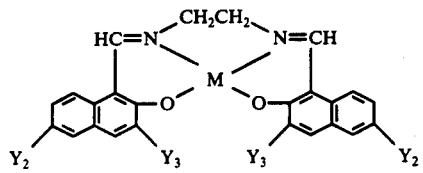

wherein $Y_3$ denotes a carboxyl group, an alkoxycarbonyl group containing 2-6 C atoms, a carbamoyl group, an alkylcarbamoyl group containing 2-6 C atoms or a phenylcarbamoyl group, M denotes copper, nickel or zinc and $Y_2$ has the meaning given in Claim 4.

6. The 1:1 nickel complex of the compound according to claim 1 of the formula

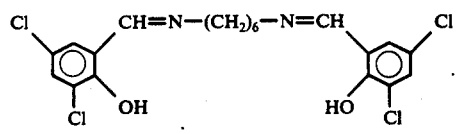

7. The 1:1 nickel complex of the compound according to claim 1 of the formula

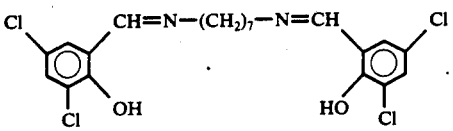

8. The 1:1 nickel complex of the compound according to claim 1 of the formula

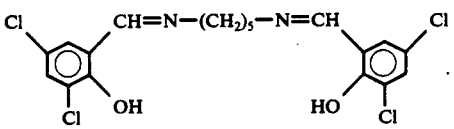

9. The 1:1-copper complex of the compound according to claim 2 of the formula

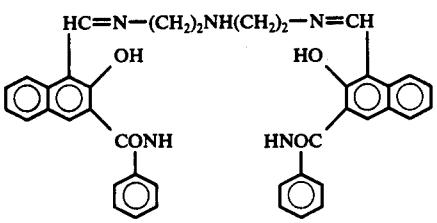

10. The 1:1-copper complex of the compound according to claim 2 of the formula

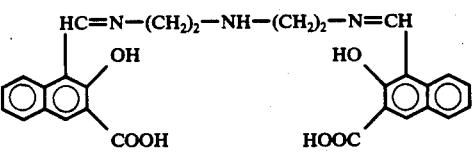

* * * * *